United States Patent
Quadrat et al.

(10) Patent No.: US 12,386,337 B2
(45) Date of Patent: Aug. 12, 2025

(54) MEASUREMENT OF TRANSFER FUNCTION IN A MECHATRONIC SYSTEM

(71) Applicant: SAFRAN ELECTRONICS & DEFENSE, Paris (FR)

(72) Inventors: Arnaud Quadrat, Moissy-Cramayel (FR); Mathieu Cuenant, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 473 days.

(21) Appl. No.: 17/799,645

(22) PCT Filed: Feb. 11, 2021

(86) PCT No.: PCT/EP2021/053388
§ 371 (c)(1),
(2) Date: Aug. 12, 2022

(87) PCT Pub. No.: WO2021/160767
PCT Pub. Date: Aug. 19, 2021

(65) Prior Publication Data
US 2023/0082667 A1 Mar. 16, 2023

(30) Foreign Application Priority Data
Feb. 14, 2020 (FR) .................... 2001504

(51) Int. Cl.
*G05B 19/4155* (2006.01)
(52) U.S. Cl.
CPC ........ *G05B 19/4155* (2013.01); *G05B 2219/34013* (2013.01)

(58) Field of Classification Search
CPC ........ G05B 13/00; G05B 15/00; G05B 19/00; G05B 17/00; G05B 21/00; G05B 2219/00
See application file for complete search history.

(56) References Cited

U.S. PATENT DOCUMENTS

2008/0262806 A1   10/2008  Vau
2016/0170400 A1*  6/2016   Iijima ................... G05B 11/011
                                                    318/606

OTHER PUBLICATIONS

He Sun et al. "Identification and adaptive control of a high-contrast focal plane wavefront correction system" arxiy.org, Cornell University Library, 201 Olin Library Cornell University Ithaca, NY 14853, Jun. 28, 2018, 30 pages.
(Continued)

*Primary Examiner* — Said Bouziane
(74) *Attorney, Agent, or Firm* — MUNCY, GEISSLER, OLDS & LOWE, P.C.

(57) ABSTRACT

A device comprising at least one electromechanical system and an electronic control unit comprising both a servo control loop connecting together the input and the output of the electromechanical system, and also a digital corrector. The device includes a software module having an input and an output connected respectively to the output and to the input of the electromechanical system. For each frequency of a set of frequencies that are to be analyzed, the software module is programmed: to issue a sinusoidal excitation signal on its output and to recover a response signal on its input; to model the response signal by means of a Fresnel representation and to filter it about the excitation frequency by means of at least one Kalman filter in order to obtain a state vector of the filtered response signal; and to obtain at least one transfer function for the system from the model, from the excitation signal, and from the input signal.

12 Claims, 4 Drawing Sheets

(56) References Cited

OTHER PUBLICATIONS

Lennart Ljung Ed-Lennart Ljung. "System Identification Toolbox 7 User's Guide" Sep. 30, 2009 (Sep. 30, 2009), System Identification Toolbox 7 User's Guide, The Mathworks, pp. 1-24, Retrieved from the Internet: http://www.mathworks.co.jp/help/pdf_doc/ident/ident. pdf [retrieved on Dec. 2, 2020] XP002683122, pp. 23-24.

* cited by examiner

MEASUREMENT OF TRANSFER FUNCTION IN A MECHATRONIC SYSTEM

BACKGROUND OF THE INVENTION

The present invention relates to the field of servo-controlled systems, such as mechatronic systems or electromechanical systems.

In such a system, the input and the output of the system are linked together by a transfer function. In a system comprising an actuator for servocontrolling the output of the system by taking account of a measurement of that output, the output depends both on the input to the system and also on disturbances that may be internal or external, on defects in the control train and/or in the feedback loop, and/or in the actuator . . . , such that it can be difficult to determine the transfer function of the system. However, knowledge of that transfer function makes it possible to obtain more accurate operation of the system that is thus looped by the actuator and the sensor(s) measuring the output of the system.

In order to determine the transfer function, it is known to connect an analyzer or an oscilloscope for performing mathematical or signal-processing functions between the input and the output of the mechatronic or electromechanical system. Nevertheless, that needs it to be possible for external equipment to be connected, possibly via interfaces such as an analog-to-digital converter (ADC) or a digital-to-analog converter (DAC). Determining the transfer function thus requires operation of the system to be interrupted in order to open the feedback loop and undertake a maintenance operation, which requires the intervention of an operator.

OBJECT OF THE INVENTION

A particular object of the invention is to enable at least one of the transfer functions of an electromechanical or mechatronic system to be determined, and to do so with limited impact on its operation and with equipment that is limited.

SUMMARY OF THE INVENTION

To this end, according to invention, there is provided a device comprising at least one electromechanical system having an input and at least one output, and an electronic control unit comprising both a servo control loop connecting together the input and the output of the electromechanical system, and also a digital corrector. The device includes a software module having an input connected to the output of the electromechanical system and an output connected to an input of the electromechanical system, and, for each frequency in a set of frequencies that are to be analyzed, the software module is programmed:
 to generate at least one sinusoidal excitation signal;
 to issue the sinusoidal excitation signal on its output and to recover a response signal on its input;
 to model the response signal by means of a Fresnel representation and to filter it about the excitation frequency by means of at least one Kalman filter in order to obtain a state vector of the filtered response signal;
 to multiply the state vector by a rotation matrix in order to obtain a real part and an imaginary part; and
 to perform complex number division to obtain at least one transfer function for the system from the model, from the excitation signal, and from the input signal.

The device of the invention thus makes it possible to determine the following transfer functions for a given system:
 the transfer function of the closed loop before and after injecting the sinusoidal signal;
 the transfer function of the open loop;
 the transfer function of the electromechanical portion; and
 the transfer function of the corrector portion.

These transfer functions can be determined by the device of the invention without any need to interrupt the servo control loop, and the computations necessary for making the estimates are relatively simple and do not require major computation resources as a result of using:
 a Fresnel representation for modelling the excitation and measurement signals in the system;
 a converged-gain Kalman filter for filtering measurements about the excitation frequency;
 a single matrix product for calculating the transfer function (in complex form) between the excitation and one of the measurements (thereby obtaining the closed loop before or after the disturbance depending on the location of the measurement point); and
 different measurement points in the loop (for a given excitation) and merely by dividing complex transfer functions by one another, it is possible to obtain:
  a. the transfer function of the open loop;
  b. the transfer function of the electromechanical portion; and
  c. the transfer function of the corrector portion.

By way of example, the invention can be used in a system for orienting and stabilizing the aiming line of an optronic device by controlling the motors of a gyro-stabilized platform on which the optronic device is mounted.

It is also possible to use invention in other actuator systems, such as a system for actuating the control surfaces of an aircraft.

Other characteristics and advantages of the invention appear on reading the following description of a particular and nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
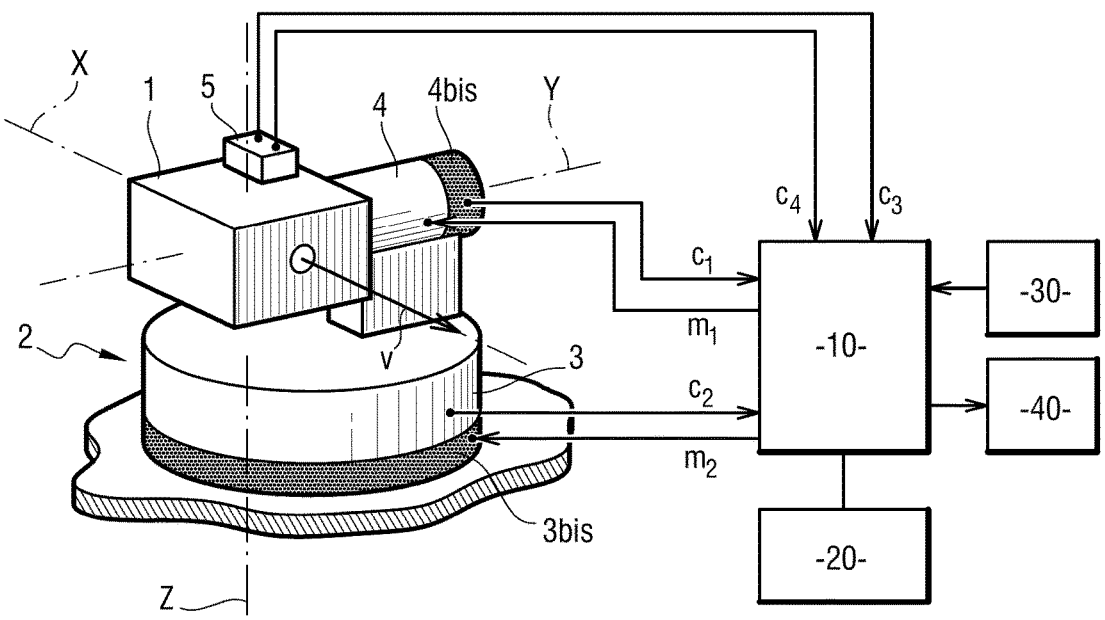
FIG. 1 is a diagrammatic perspective view of an optronic device performing the invention.

With reference in particular to FIG. 1, the invention is described below in application to an optronic device including an optical sensor 1 mounted on a gyro-stabilized platform 2. The gyro-stabilized platform 2 has two motor-driven axes, namely: a bearing axis z for adjusting the orientation of an aiming axis v of the optical sensor 1 about the bearing axis z, and an elevation axis y for adjusting the orientation of the aiming axis v about the elevation axis y. Each of the axes z and y is provided with a respective motor 3 and 4 arranged to orient the aiming line v of the sensor 1 about the corresponding axis z or y, and each motor is associated with a respective angle sensor 3 bis or 4 bis, such as a coder or a resolver.

The motors 3 and 4, and the associated angle sensors 3 bis and 4 bis are connected to a control device 10 that issues respective commands m1 and m2 to the motors 3 and 4, and that receives respective measurements c1 and c2 from the angle sensors 3 bis and 4 bis.

The optical sensor 1 is provided with at least one inertial angle sensor 5 in order to detect an angular velocity c3 of the aiming axis v relative to a first reference axis that is collinear with the elevation axis y, and an angular velocity c4 of the aiming axis v relative to a second reference axis that is perpendicular to the aiming axis v and to the elevation axis y. In this example, the inertial angle sensor is a gyro having two sensing axes, such as the gyro produced under the trademark GSL by the Applicant. In a variant, any other angle measuring device could be used, and for example it is possible to use two inertial sensors, each having a respective sensing axis, such as the device produced under the trademark QUAPASON by the Applicant. The inertial sensor could be a mechanical sensor having a vibrating resonator, e.g. a hemispherical resonator, or use could be made of other technologies, such as optical fibers (a so-called fiber-optic gyro (FOG) sensor).

The inertial sensor 5 is also connected to the control device 10, and it transmits the measurement signals c3 and c4 thereto.

Figure 2:
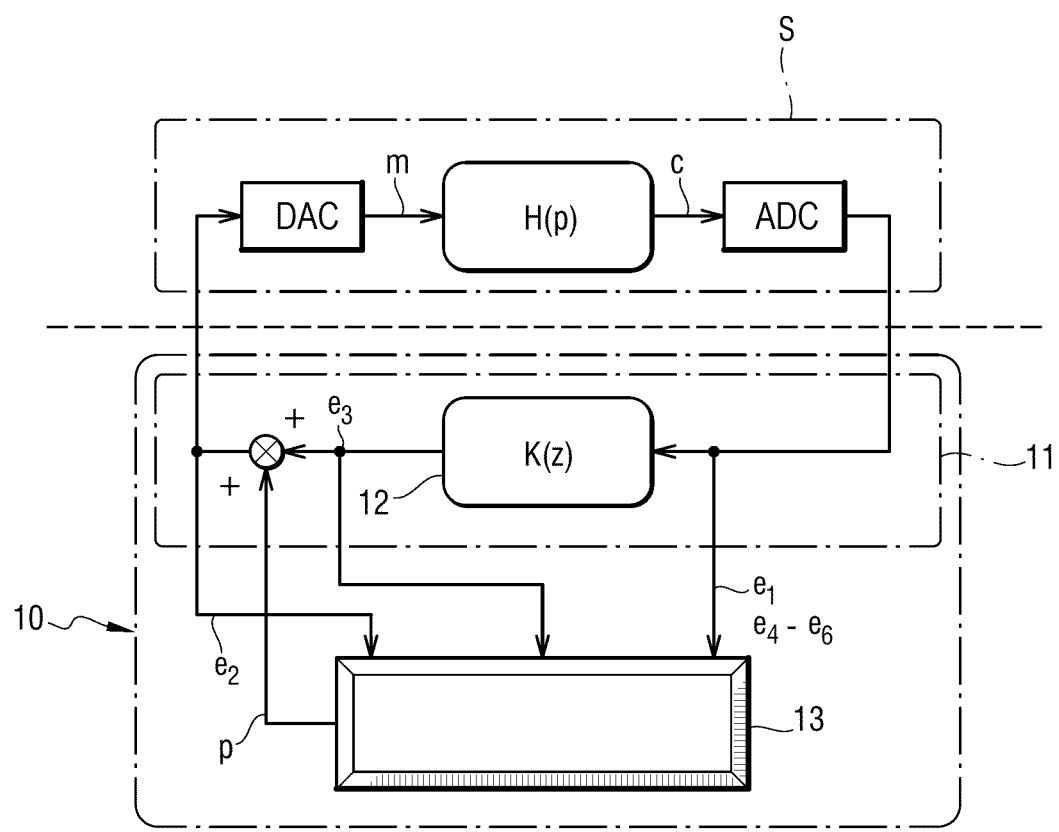
FIG. 2 is a diagrammatic view of the control unit of the device.
Figure 3:
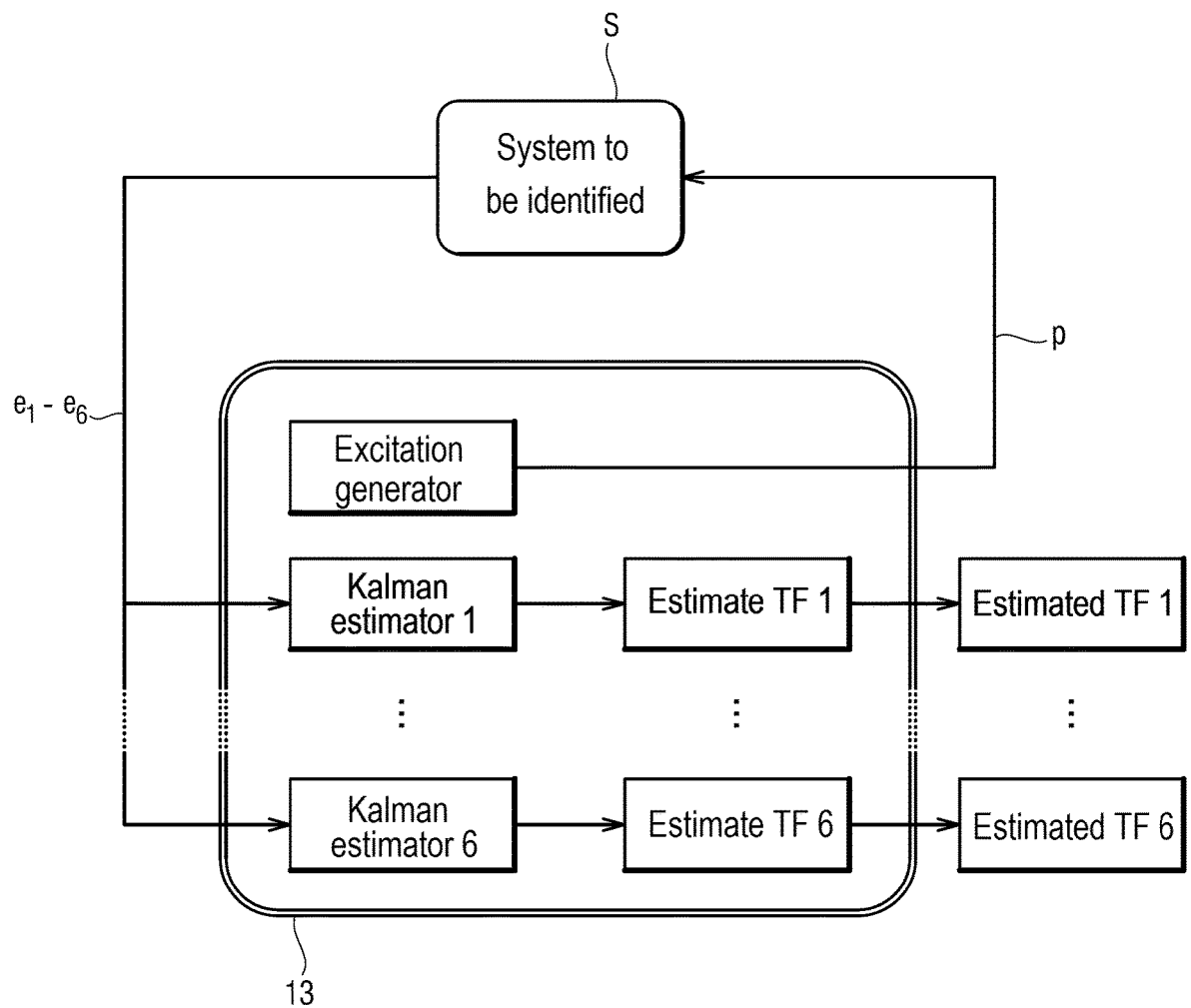
FIG. 3 is a diagrammatic view showing detail of the control unit of the device.

With reference also to FIGS. 2 and 3, for each axis, each of the assemblies formed by means of a motor 3 or 4 and one of the associated angle sensors 5, 3 bis, or 4 bis (which may be relative and/or inertial sensors) forms a linear system S having an input (the power supply line delivering a voltage signal to the motor 3 or 4) and an output (the output line from an angle sensor 5, 3 bis, or 4 bis delivering a measurement signal).

For each linear system referenced H, the control device 10 includes an electronic control unit 11 having a servo control loop that connects together the input and the output of the linear system by means of a digital corrector 12. The electronic control unit 11 is thus arranged to act via the digital corrector 12 to control the motors as a function of commands coming from a user interface 20 (visible in FIG. 1) and as a function of the measurement signals coming either from coders or else from inertial sensors. It can be understood that each control signal m input to one of the motors 3 or 4 gives rise to a corresponding movement of the optical sensor 1, which movement is detected by the relative angle sensor 3 bis or 4 bis or by the inertial angle sensor 5 that senses relative to the axis corresponding to the motor 3 or 4 and that issues a measurement signal c corresponding to the convolution of the transfer function H by the difference between the measurement signal c and the setpoint, i.e.:

$$m=K^*(\text{setpoint}-c) \text{ and } c=H^*m.$$

This mode of operation is conventional and is not described in greater detail herein.

The control device 10 exchanges data with memory modules 30 and 40. The memory module 30 comprises a table of the frequencies $f_p$ that are to be scanned, of the amplitudes $P_0$ of the associated excitation signals, and of the vectors of the associated Kalman gains $K_f$.

The control device 10 includes a software module 13 having an output p connected to an output e3 of the digital corrector 12, at least one first measurement input e1 connected upstream from an input of the digital corrector 12, and two measurement inputs e2 and e3 connected to the output of the digital corrector 12 respectively downstream and upstream from the connection between said output e3 of the digital corrector 12 and the output p of the software module 13. Thus, the output p added to the output e3 of the digital corrector 12 gives the signal of input e2 that is to be applied to the motor via the digital-to-analog converter and the signal m.

The software module 13 is programmed:
to form an excitation generator based on a rotation increments matrix and on a Fresnel model, the generator being arranged to issue (to an input p of the system S) final excitation signals P of different frequencies and/or of different amplitudes on the output of the corrector by using a software sum e2=e3+P;
to recover on each of its inputs a respective sinusoidal measurement signal e1 to e6 for each of the sinusoidal excitation signals;
to model the measurement signals e1 to e6 (FIG. 3) on the basis of a Fresnel vector and of a state representation;
to filter the measurement signals e1 to e6 by bandpass filtering about the excitation frequency using a plurality of Kalman filters connected in parallel so as to obtain state vectors of the filtered measurement signals;
to multiply the state vectors of the filtered signals by a rotation matrix "T" to obtain the real and imaginary parts of the transfer functions, where the components of the rotation matrix "T" are obtained from the components of the excitation vector; and
to store the real and imaginary parts of the transfer functions (reference 40 in FIG. 1) and to obtain the transfer functions of the loop by making use of complex number division.

The software module 13 is arranged to scan a plurality of frequencies, recovering for each frequency the excitation amplitude and the gains of the Kalman filters stored in a memory (30 see FIG. 1).

By way of example, the software module 13 is arranged to be capable of estimating a plurality of transfer functions, which are identified as TF 1 to TF 6 in FIG. 3, each representing a set of six measurements (e.g. currents, inertial speeds, relative positions) relating to an electromechanical system S implemented in a single device.

The principle of the invention for determining one of the transfer functions is described below in its three main stages: generating a sinusoidal excitation signal at the frequency $f_p$, bandpass filtering using a Kalman filter about the frequency $f_p$, and multiplying by a rotation matrix in order to obtain the real and imaginary parts of the transfer function between the excitation and the measurement under consideration at the frequency $f_p$.

The excitation signal (disturbance) is a sinusoidal signal, for example a cosine of amplitude $P_0$ at the frequency $f_p$, and it can be modelled in the form of a vector that is representative of a complex number and that rotates at a constant speed $\dot\theta=2\pi \cdot f_P$ (known as a "Fresnel representation"). At the instant $t_k$, the complex number is written as follows:

$$\hat{P}_k \triangleq P_0 \cdot \exp(i \cdot 2\pi \cdot f_P \cdot t_k) = P_0 \cdot \exp(i \cdot \theta_k) = P_0 \cdot \cos(\theta_k) + i \cdot P_0 \cdot \sin(\theta_k)$$

The voltage disturbance that is actually injected may be expressed as being the real part of the complex number, i.e.:

$$P_k = P(t_k) = P_0 \cdot \cos(\theta_k) = \text{Re}\{P_0 \cdot \exp(i \cdot 2\pi \cdot f_P \cdot t_k)\}$$

While the imaginary part of the complex number is left free:

$P_0 \cdot \sin(\theta_k) = \text{Im}\{P_0 \cdot \exp(i \cdot 2\pi \cdot f_P \cdot t_k)\}$ This can be written in matrix form as follows:

$$X_k^P \triangleq \begin{bmatrix} \text{Re}\{\hat{P}\} \\ \text{Im}\{\hat{P}\} \end{bmatrix} = \begin{bmatrix} \text{Re}\{P_0 \cdot \exp(i.2\pi.f_P.t_k)\} \\ \text{Im}\{P_0 \cdot \exp(i.2\pi.f_P.t_k)\} \end{bmatrix} = \begin{bmatrix} P_0 \cos(\theta_k) \\ P_0 \sin(\theta_k) \end{bmatrix}$$

For a constant frequency $f_p$, the transition matrix between two sampling periods $T_e$ corresponds to rotation through the angle $\Delta\theta = \theta_{k+1} - \theta_k = 2\pi \cdot f_P \cdot T_e$, where $T_e$ is the sampling period of the calculation means ($T_e = t_{k+1} - t_k$). The transition matrix is written as follows:

$$\Delta A = \begin{bmatrix} \cos(2\pi f_p T_e) & -\sin(2\pi f_p T_e) \\ \sin(2\pi f_p T_e) & \cos(2\pi f_p T_e) \end{bmatrix}$$

The matrix relationship between two consecutive instants is thus:

$$\begin{bmatrix} P_0 \cos(\theta_{k+1}) \\ P_0 \sin(\theta_{k+1}) \end{bmatrix} = \begin{bmatrix} P_0 \cos(\theta_k + \Delta\theta) \\ P_0 \sin(\theta_k + \Delta\theta) \end{bmatrix} = \Delta A \begin{bmatrix} P_0 \cos(\theta_k) \\ P_0 \sin(\theta_k) \end{bmatrix}$$

Below, it should be understood that the rotation matrix at the instant k is the product of k transition increments:

$$A_k = (\Delta A)^k = \begin{bmatrix} \cos(\theta_k) & -\sin(\theta_k) \\ \sin(\theta_k) & \cos(\theta_k) \end{bmatrix} = \frac{1}{P_0} \begin{bmatrix} (X_k^P)_1 & -(X_k^P)_2 \\ (X_k^P)_2 & (X_k^P)_1 \end{bmatrix}$$

It should be observed that the inverse rotation matrix is simply the transpose. It too is calculated using the components of the excitation vector:

$$(A_k)^{-1} = \begin{bmatrix} \cos(\theta_k) & \sin(\theta_k) \\ -\sin(\theta_k) & \cos(\theta_k) \end{bmatrix} = \frac{1}{P_0} \begin{bmatrix} (X_k^P)_1 & -(X_k^P)_2 \\ (X_k^P)_2 & (X_k^P)_1 \end{bmatrix}$$

The notation $(\cdot)_n$ designates the "$n^{th}$" component of the vector representative of the disturbance.

Taking the disturbance $P_k$ as the first component of the state vector, the following discrete dynamic system is obtained:

$$\begin{cases} X_{k+1}^P = \Delta A \cdot X_k^P \\ P_k = C \cdot X_k^P \end{cases}$$

in which B=D=0 and C=[1 0].

As shown in FIG. 2, the excitation signal (disturbance) is applied to the output of the digital corrector by using a software sum $e_2 = e_3 + P$.

The matrix form of the dynamic system is adapted for performing Kalman filtering. $P_0$ is taken as the initial amplitude condition of the excitation signal (disturbance) associated with a phase of zero, such that the initial vector is:

$$X_0^P = \begin{bmatrix} P_0 \\ 0 \end{bmatrix}$$

Concerning the frequency response of the electromechanical system and the matrix product, a formulation in the form of a linear dynamic system makes it possible to treat the physical system as a linear filter that receives the disturbance $P_k$ as input to give the measurement $M_k$ as output. Using the z transform and the notation $\hat{F}(z)$ for the transfer function that is to be estimated, the following is obtained:

$\hat{M}(z) = \hat{F}(z)\hat{P}(z)$

When the delay operator $z^{-1} = \exp(-i \cdot 2\pi \cdot f \cdot T_e) \forall_f$, this gives:

$M_{k-1} = z^{-1} \cdot M_k$

For a linear system excited with a pure cosine at the frequency $f_p$, the measurement is a cosine of amplitude $M_P$ and of phase $\omega_P$, and it takes the following matrix form:

$$X_k^M \triangleq \begin{bmatrix} \text{Re}\{\hat{M}_k\} \\ \text{Im}\{\hat{M}_k\} \end{bmatrix} = \begin{bmatrix} M_P \cdot \cos(2\pi.f_P.t_k + \psi_P) \\ M_P \cdot \sin(2\pi.f_P.t_k + \psi_P) \end{bmatrix}$$

The measurement that is directly accessible is $M_k = C \cdot X_k^M$, whereas it is the following that is being looked for:

$$\hat{F}(f_P) \triangleq \frac{\hat{M}(f_P)}{\hat{P}(f_P)} =$$

$$\frac{M_P \cdot \exp(i(2\pi.f_P.t_k + \psi_P))}{P_0 \exp(i.2\pi.f_P.t_k)} = \frac{M_P}{P_0} \exp(i\psi_P) = \frac{M_P}{P_0} \cos(\psi_P) + i \frac{M_P}{P_0} \sin(\psi_P)$$

Figure 4:
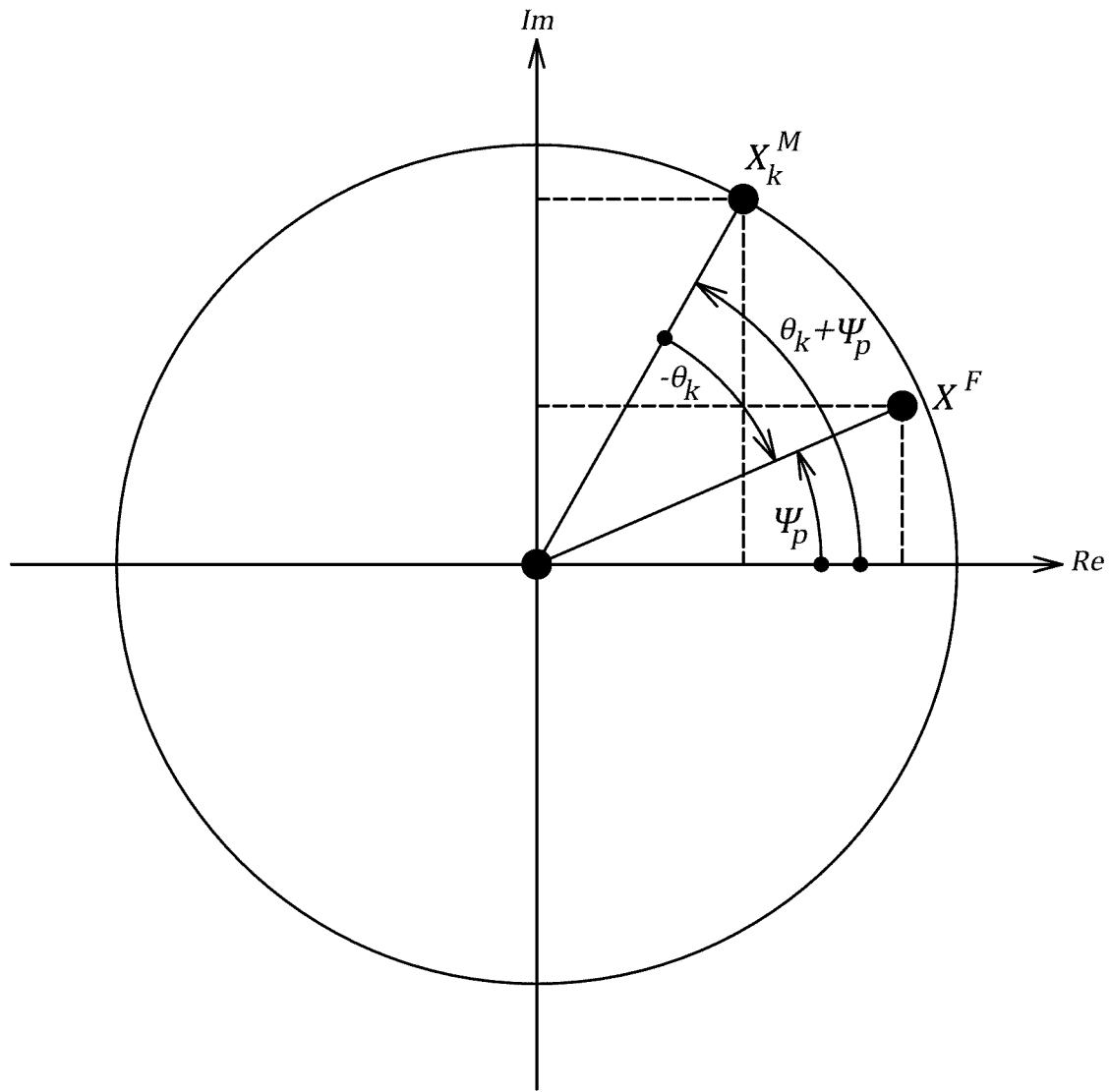
FIG. 4 is is a diagram of a Fresnel representation of the measurement signal and of the transfer function of the system.

This can be written in matrix form:

$$X^F \triangleq \begin{bmatrix} \text{Re}\{\hat{F}(f_P)\} \\ \text{Im}\{\hat{F}(f_P)\} \end{bmatrix} = \begin{bmatrix} \frac{M_P}{P_0} \cdot \cos(\psi_P) \\ \frac{M_P}{P_0} \cdot \sin(\psi_P) \end{bmatrix}$$

Where the "matrix" measurement $X_k^M$ and the transfer function $X^F$ are associated by the following trigonometrical relationships (see the Fresnel diagram of FIG. 4):

$$X_k^M = \begin{bmatrix} \cos(\theta_k) & -\sin(\theta_k) \\ \sin(\theta_k) & \cos(\theta_k) \end{bmatrix} \cdot X^F \cdot P_0$$

I.e., on being inversed:

$$X^F = \frac{1}{P_0} \begin{bmatrix} \cos(\theta_k) & -\sin(\theta_k) \\ \sin(\theta_k) & \cos(\theta_k) \end{bmatrix}^{-1} X_k^M =$$

$$\frac{1}{P_0} \begin{bmatrix} \cos(\theta_k) & \sin(\theta_k) \\ -\sin(\theta_k) & \cos(\theta_k) \end{bmatrix} X_k^M = \frac{A_k^{-1}}{P_0} X_k^M = \frac{1}{P_0^2} \begin{bmatrix} (X_k^P)_1 & (X_k^P)_2 \\ -(X_k^P)_2 & (X_k^P)_1 \end{bmatrix} X_k^M$$

and:

$$X^F = T_k \cdot X_k^M$$

$$T_k = \frac{1}{P_0^2} \begin{bmatrix} (X_k^P)_1 & (X_k^P)_2 \\ -(X_k^P)_2 & (X_k^P)_1 \end{bmatrix}$$

The real and imaginary components of the transfer function are obtained merely by a matrix product of the ideal measurement signal multiplied by a single rotation matrix of components that have already been calculated by generating the excitation signal:

$$\hat{F}(f_p) = (X^F)_1 + i(X^F)_2$$

where i is the imaginary unit such that $i^2 = -1$.

There follows a description of the bandpass filtering by Kalman filtering.

In order to estimate the real part and the imaginary part of the measurement $X_k^M$ from the real measurement $M_k$, use is made of a converged-gain Kalman filter that acts as a selective bandpass filter about the excitation frequency:

$$\begin{cases} X_{k+1}^M = \Delta A \cdot X_k^M + B \cdot w_k \\ M_k = C \cdot X_k^M + v_k \end{cases}$$

In which:
$w_k$ is the noise of the scalar model;
$v_k$ is the scalar measurement noise;
$\Delta A$ is the transition matrix;
$C = [1\ 0]$ is the observation matrix of the disturbance generator; and
$B^T = [1\ 1]$ is the state noise injection matrix.
The variance of the measurement noise is $V = E[v_k^2]$.
The variance matrix of the model noise is:

$$W = BE[w_k^2]B^T$$

The filter may be represented in the form of the following state representation:

$$\begin{cases} \hat{X}_{k+1|k}^M = \Delta A(I - K_f C)\hat{X}_{k|k-1}^M + \Delta A K_f M_k \\ \hat{X}_{k|k}^M = (I - K_f C)\hat{X}_{k|k-1}^M + K_f M_k \end{cases}$$

The matrix $K_f$ is the converged-gain matrix of the Kalman filter, such that:

$$K_f = ZC^T(CZC^T + V)^{-1}$$

and $$\Delta A Z(\Delta A)^T - Z - \Delta A Z C^T(CZC^T + V)^{-1}CZ(\Delta A)^T + W = 0$$

In which Z is the solution of the Riccati equation.

In practice, in order to determine the transfer function of the linear system in real time, the following are known, the frequency $f_p$ of each disturbance signal, the amplitude $P_0$, the duration of the filtering $T_f$, and the gain of the Kalman filter, i.e.:

$$K_f = \begin{bmatrix} k_1 \\ k_1 \end{bmatrix}$$

In order to scan all of the frequencies in a given interval, the following algorithm is performed:

---
Algorithm:

Review all of the frequencies $f_P$
- If $t_k = 0$

Initialize: $X_0^P = \begin{bmatrix} P_0 \\ 0 \end{bmatrix}$

---
-continued

Algorithm:

Calculate $\Delta A = \begin{bmatrix} \cos(2\pi f_p T_e) & -\sin(2\pi f_p T_e) \\ \sin(2\pi f_p T_e) & \cos(2\pi f_p T_e) \end{bmatrix}$

- If $0 < t_k < T_f$ then

Calculate the disturbance $\begin{cases} X_{k+1}^P = \Delta A \cdot X_k^P \\ P_k = C \cdot X_k^P \end{cases}$ Store the state of the disturbance $X_k^P \leftarrow X_{k+1}^P$
  Allocate the disturbance to the motor voltage: $P_k$
  Read the measurements: $M_k$
  For each measurement, filter:

$\begin{cases} \hat{X}_{k+1|k}^M = \Delta A(I - K_f C)\hat{X}_{k|k-1}^M + \Delta A K_f M_k \\ \hat{X}_{k|k}^M = (I - K_f C)\hat{X}_{k|k-1}^M + K_f M_k \end{cases}$ For each measurement, store: $\hat{X}_{k|k-1}^M \leftarrow \hat{X}_{k+1|k}^M$

- If $t_k = T_f$ then $T_k = \frac{1}{P_0^2}\begin{bmatrix} (X_k^P)_1 & (X_k^P)_2 \\ -(X_k^P)_2 & (X_k^P)_1 \end{bmatrix}$ For the current frequency of each measurement, calculate and store: $X^F = T_k \cdot \hat{X}_{k|k}^M$
  $t_k = 0$ and move on to the
  new frequency.

---

Output
$X^F = [\text{real FT, imag FT}]^T$ for each frequency and for each measurement.

It should be observed that in this example, the equations of the Kalman filter are put in the form of a recursive filter with a single state vector, as in equation 2.31 of the document "Introduction to Kalman filtering" by D. Alazard. Nevertheless, it is also possible to write them in the prediction/updating form with two state vectors (see equations 2.23 and 2.25 of that document) as in the description below of the continuous component.

Estimates are thus obtained of at least three transfer functions of the looped system, between the excitation signal and at least three measurements, such that $$\hat{F}_{mesn}(f_p) = \frac{e_n}{s_1}$$

without any need for operator intervention in order to separate the servo control loop from the actuator.

The various transfer functions of the loop are then determined as follows.

With the notation of FIG. 2 and using complex number division, the following operations are performed:

a/ For the current frequency, storing for the current frequency the real parts of at least the following three closed loops:

$$\hat{F}_{mes1}(f_p) = \frac{e_1}{s_1} = \frac{H}{1 + KH}$$

$$\hat{F}_{mes2}(f_p) = \frac{e_2}{s_1} = \frac{1}{1 + KH}$$

$$\hat{F}_{mes3}(f_p) = \frac{e_3}{s_1} = \frac{KH}{1 + KH}$$

b/ Calculating the open loop with:

$$HK = \frac{e_3}{e_2} = \hat{F}_{mes3}/\hat{F}_{mes2}$$

c/ Calculating the transfer function of the electromechanical portion:

$$H = \frac{e_1}{e_2} = \hat{F}_{mes1}/\hat{F}_{mes2}$$

There follows a description of a preferred embodiment, making use of reformulation and extension in order to take the continuous components of the measurements into account.

In the preferred embodiment, it is not a cosine that is injected, but rather an excitation sine having a predetermined frequency $f_P$ in hertz (Hz).

When a sine type excitation signal is injected into a linear system, the system responds with a sine line that is amplified by a gain $$G_p = \frac{M_p}{P_0}$$

and phase shifted by a phase $\Psi_p$.

The state representation of the sinusoidal line of the measurement without a continuous component thus has two dimensions and is given by:

$$\begin{cases} X^S_{k+1} = \begin{bmatrix} \cos(2\pi f_p T_e) & -\sin(2\pi f_p T_e) \\ \sin(2\pi f_p T_e) & \cos(2\pi f_p T_e) \end{bmatrix} X^S_k \\ Y^S_k = [0 \ 1] X^S_k \end{cases}$$

where:

$$X^S_0 = \begin{bmatrix} M_p \cos(\Psi_p) \\ M_p \sin(\Psi_p) \end{bmatrix}$$

$$X^S_k = \begin{bmatrix} M_p \cos(2\pi f_p k T_e + \Psi_p) \\ M_p \sin(2\pi f_p k T_e + \Psi_p) \end{bmatrix}$$

$$Y^S_k = G_p P_0 \sin(2\pi f_p k T_e + \Psi_p)$$

The state vector represents the cosine (plotted along the x-axis) and the sine (plotted along the y-axis) on a circle of radius $M_p = G_p P_0$ for a vector rotating at the frequency $f_p$ and starting from an initial position determined by the angle $\Psi_p$.

Thus, the following matrices are obtained for the state representation of the Fresnel vector:

$$\begin{cases} \Delta A = \begin{bmatrix} \cos(2\pi f_p T_e) & -\sin(2\pi f_p T_e) \\ \sin(2\pi f_p T_e) & \cos(2\pi f_p T_e) \end{bmatrix} & B = \begin{bmatrix} 0 \\ 0 \end{bmatrix} \\ C = [0 \ 1] & D = 0 \end{cases}$$

where, in conventional manner for state representation, $\Delta A$ is the transition matrix, B is the control matrix, C is the observation matrix, and D is the direct action matrix.

Nevertheless, in practice, it is probable that the response of the system also includes a continuous component corresponding to the operating point about which the system is excited.

This continuous component constitutes a bias that has the following discrete state representation:

$$\begin{cases} X^B_{k+1} = X^B_k \\ Y^B_k = X^B_k \end{cases}$$

$$X^B_0 = \text{bias}$$

By adding this representation to the state representation of the sine line, the state representation is obtained for a sine having a continuous component in three-dimension for the various measurements, namely:

$$\begin{cases} X^M_{k+1} = \begin{bmatrix} \cos(2\pi f_p T_e) & -\sin(2\pi f_p T_e) & 0 \\ \sin(2\pi f_p T_e) & \cos(2\pi f_p T_e) & 0 \\ 0 & 0 & 1 \end{bmatrix} X^M_k \\ Y^M_k = [0 \ 1 \ 1] X^M_k \end{cases} \quad (1)$$

where:

$$\begin{cases} \Delta A_M = \begin{bmatrix} \cos(2\pi f_p T_e) & -\sin(2\pi f_p T_e) & 0 \\ \sin(2\pi f_p T_e) & \cos(2\pi f_p T_e) & 0 \\ 0 & 0 & 1 \end{bmatrix} & B = \begin{bmatrix} 0 \\ 0 \end{bmatrix} \\ C_M = [0 \ 1 \ 1] & D_M = 0 \end{cases} \quad (2)$$

$$X^M_0 = \begin{bmatrix} M_p \cos(\Psi_p) \\ M_p \sin(\Psi_p) \\ b_0 \end{bmatrix}$$

$$X^M_k = \begin{bmatrix} M_p \cos(2\pi f_p k T_e + \Psi_p) \\ M_p \sin(2\pi f_p k T_e + \Psi_p) \\ b_0 \end{bmatrix}$$

$$Y^M_k = b_0 + G_p P_0 \sin(2\pi f_p k T_e + \Psi_p)$$

There is no need for the excitation generator to have a continuous component. In order to design the sinusoidal excitation generator, it suffices to simulate the model described by the state representation of the sine line. The amplitude and the phase are selected by imposing initial conditions on the model. A phase of zero is selected for the sine wave that is to be generated so as to start excitation of the system progressively (sin(t=0)=0). A generator of a sine wave of amplitude $P_0$ is obtained as follows:

initial condition $$X^P_0 = \begin{bmatrix} P_0 \\ 0 \end{bmatrix}$$

with the excitation signal having the dynamic range:

$$X_{k+1}{}^P = \Delta A_P X_k{}^P$$

$$P_k = C_P X_k{}^P$$

and with the following state representation matrices:

$$\begin{cases} \Delta A_P = \begin{bmatrix} \cos(2\pi f_p T_e) & -\sin(2\pi f_p T_e) \\ \sin(2\pi f_p T_e) & \cos(2\pi f_p T_e) \end{bmatrix} & B_P = \begin{bmatrix} 0 \\ 0 \end{bmatrix} \\ C_P = [0 \ 1] & D_P = 0 \end{cases}$$

Each measurement from a sensor is a sine line including a continuous component, from which the state of the Fresnel vector is estimated by using a Kalman filter constituting an estimator corresponding to a bandpass filter about the frequency $f_p$ for the first two components of the state vector, and a lowpass filter for the continuous portion, based on the models (1) and (2). Once this state has been estimated, it is possible to estimate the corresponding transfer function between the excitation (input) and the measurement (output).

At the output from the transfer function estimator, there are obtained directly in the real part and the imaginary part of the transfer function at the frequency $f_p$.

The model of the augmented Kalman estimator takes the following general form:

$$\begin{cases} X^M_{k+1} = \Delta A_M X^M_k + B_M U_k + M w_k \\ Y^M_k = C_M X^M_k + D_M U_k + v_k \end{cases}$$

With:

$\Delta A_M$, $B_M$, $C_M$, $D_M$ as above;
$U_k$ represents the commands;
$v_k$ the measurement noise;
$w_k$ the noise of the model; and
the selected matrix M is the following:

$$M = \begin{pmatrix} 1 & 0 & 0 \\ 0 & 1 & 0 \\ 0 & 0 & 1 \end{pmatrix}$$

Since the matrices $B_M$, $D_M$ are zero, it is possible to simplify the model:

$$\begin{cases} X^M_{k+1} = \Delta A_M X^M_k + M w_k \\ Y^M_k = C_M X^M_k + v_k \end{cases}$$

The notation V[1×1] and W[3×3] is used for the covariance matrices of the measurement noise $v_k$ and of the model noise $w_k$, which noise is assumed to be Gaussian for a linear Kalman estimator. The steady state of the estimator is determined solely by the selected covariance matrices V and W. Given that the estimator is implemented with converged gain, it is possible to set V=1 arbitrarily without loss of generality. W, the covariance matrix of the noise of the model, is selected as follows:

$$W = \begin{pmatrix} \sigma^2_{line} & 0 & 0 \\ 0 & \sigma^2_{line} & 0 \\ 0 & 0 & \sigma^2_{bias} \end{pmatrix}$$

Thus, selecting the variance pair ($\sigma_{line}^2$ $\sigma_{bias}^2$) serves to define completely the steady state of the Kalman estimator.

A state representation of the estimator is written:

$$\left[\begin{array}{c|c} A_K & B_K \\ \hline C_K & D_K \end{array}\right]$$

The following is then obtained:

$$\begin{cases} A_K = \Delta A_M (I - K_f C_M) & B_K = \Delta A_M K_f \\ C_K = I - K_f C_M & D_K = K_f \end{cases}$$

where:

$$K_f = Z C_M^T (C_M Z C_M^T + V)^{-1}$$

In this representation, Z is the only solution that stabilizes the algebraic Riccati equation:

$$Z = \Delta A Z (\Delta A)^T - \Delta A Z C_M^T (C_M Z C_M^T + V)^{-1} C_M Z (\Delta A)^T + W$$

It should be observed that this equation presents a singularity in the event that the frequency $f_p$ is equal to half the sampling frequency $F_e = 1/T_e$. In the general case, this equation can be solved for example using the "dare" function of the "Matlab" language that also serves to determine the eigenvalues of $A_k$ that enable the time constant $\tau_K$ of the bandpass filter to be determined for the first two components of the state vector and of the lowpass filter of the continuous component.

As mentioned above, the settings of the estimator (i.e. the width of the band about $f_p$, and the cut-off frequency for the lowpass filter) are obtained by selecting the pair of variances ($\sigma_{line}^2$ $\sigma_{bias}^2$) that enable the steady state Kalman estimator to be defined completely.

Assuming that the variance $\sigma_{bias}^2$ is fixed, then reducing the variance $\sigma_{line}^2$ gives rise to a reduction in the width of the bandpass filtering, and thus to a better estimate of the sine line as a result of better filtering of the noise and of any nonlinearities of the system. If the time constant $\tau_K$ of the filter is equal to the time constant of the line, then this reduction in the variance $\sigma_{line}^2$ is accompanied by an increase in the time constant of the filter. It is therefore necessary to seek a compromise between the quality of the estimate (narrowness of the filter) and the convergence time of the estimator.

Assuming that the variance $\sigma_{line}^2$ is fixed, then a reduction in the variance $\sigma_{bias}^2$ give rise to a deterioration in the filtering of low frequencies for the cosine and sine components. In addition, the cut-off frequency of the response corresponding to the continuous component (bias) decreases when the variance $\sigma_{bias}^2$ decreases (which amounts to increasing measurement noise relative to the noise of the model), giving rise to filtering that is more conservative.

By way of example, for a given sampling frequency $F_e$, for given minimum and maximum frequencies $f_{min}$ and $f_{max}$ of the excitation signal, and for a number $N_{points}$ of frequencies to be identified in this frequency range, it is proposed to set the estimator as follows:

determine the variance $\sigma_{line}^2$ so as to obtain the desired width for the bandpass filtering. This is done more for middle/high frequencies in the frequency range so that the filter is not disturbed by the continuous component of the model. It is ensured that the filter is indeed symmetrical about the selected frequency;

determine the variance $\sigma_{bias}^2$ on the lowest frequency that is to be identified ($f_{min}$) so that the selectivity of the filter remains acceptable at this frequency; and calculate the total duration for the identification induced by these settings. If the generation is not satisfactory, increase the variance $\sigma_{line}^2$ or decrease the number of frequencies to be identified. This type of scanning has a strong impact on the duration of identification: in order to reduce it, it is preferable to select scanning that is linear rather than logarithmic.

In the present example, ($\sigma_{line}^2$ $\sigma_{bias}^2$)=($10^{-4}$ $10^{-2}$) is selected for a sampling frequency $F_e$ of 3 kHz. By way of example, this setting is appropriate for aiming an optronic device. For some other application, the above-mentioned values can serve as starting points for converging on settings that are more appropriate for said application.

In particular, such an application might require a sampling frequency that is different. However, it is known that for a given setting of the pair ($\sigma_{line}^2$ $\sigma_{bias}^2$), the width of the bandpass filter increases with increasing sampling frequency: identification is thus faster but of poorer quality. This problem can be solved by recalculating the values of the ($\sigma_{line}^2$ $\sigma_{bias}^2$) pairs so as to guarantee a time constant that is almost identical and a frequency response that is equivalent when changing from one sampling frequency to another.

In a variant, it is possible to reduce the calculation burden by making use of an estimator that is no longer in the form of a state representation $$\left[\begin{array}{c|c} A_K & B_K \\ \hline C_K & D_K \end{array}\right]$$

as described above (i.e. in the form of a recursive filter having a single state vector, but rather in the prediction/updating form with two state vectors, by using the notation $\hat{X}_{k+1|k}^M$ for the predicted state and $\hat{X}_{k+1|k+1}^M$ for the updated state (output from the estimator), with the recurrence equations of the filter at instant k+1 being:

$$\begin{cases} \hat{X}_{k+1|k}^M = \Delta A_M \hat{X}_{k|k}^M \\ \hat{X}_{k+1|k+1}^M = \hat{X}_{k+1|k}^M + K_f\left(Y_{k+1}^M - C_M \hat{X}_{k+1|k}^M\right) \end{cases}$$

The Kalman gain $K_f$ is the same as that defined above. This implementation is mathematically equivalent to the preceding implementation, but less expensive in calculation time.

The transfer function estimator calculates the real and imaginary parts of the transfer function $\hat{F}$, between the sinusoidal excitation signal and the measurement that is obtained, for one of the following three closed loops:

$$\hat{F}_{mes\,1}(f_p) = \frac{e_1}{s_1} = \frac{H}{1+KH}$$

$$\hat{F}_{mes\,2}(f_p) = \frac{e_2}{s_1} = \frac{1}{1+KH}$$

$$\hat{F}_{mes\,3}(f_p) = \frac{e_3}{s_1} = \frac{KH}{1+KH}$$

It is thus sought to estimate the following (where i is the imaginary unit such that $i^2=-1$):

$$\hat{F}(f_p) = R_p + iI_p = G_p(\cos(\Psi_p) + i\sin(\Psi_p))$$

The state of the excitation generator at instant k is written $X_k^P$, and the process estimated by the Kalman filter on the basis of the measurement is written $\hat{X}_{k|k}^M$. The following is obtained:

$$\begin{cases} X_k^P = P_0 \begin{bmatrix} \cos(2\pi f_p k T_e) \\ \sin(2\pi f_p k T_e) \end{bmatrix} \\ \hat{X}_{k|k}^M \cong X_k^M = \begin{bmatrix} G_P P_0 \cos(2\pi f_p k T_e + \Psi_p) \\ G_P P_0 \sin(2\pi f_p k T_e + \Psi_p) \\ b_0 \end{bmatrix} \end{cases}$$

The pair $$\begin{bmatrix} G_P \cos(\Psi_p) \\ G_P \sin(\Psi_p) \end{bmatrix}$$

is obtained from the state of the process $\hat{X}_{k|k}^M$ by a matrix T constructed using the terms $X_k^P$ and $P_0$:

$$T = \frac{1}{P_0^2}\begin{bmatrix} (X_k^P)_1 & (X_k^P)_2 & 0 \\ -(X_k^P)_2 & (X_k^P)_1 & 0 \\ 0 & 0 & 1 \end{bmatrix}$$

As before;

$$(A_k)^{-1} = \frac{1}{P_0}\begin{bmatrix} (X_k^P)_1 & (X_k^P)_2 & 0 \\ -(X_k^P)_2 & (X_k^P)_1 & 0 \\ 0 & 0 & P_0 \end{bmatrix}$$

is a rotation matrix.

This gives:

$$X^F = \begin{bmatrix} G_P \cos(\Psi_p) \\ G_P \sin(\Psi_p) \\ \frac{b_0}{P_0^2} \end{bmatrix} = TX_k^M$$

giving rise to estimates of the real part $R_p$ and of the imaginary part $I_p$ such that:

$$X^F = \begin{bmatrix} G_P \cos(\Psi_p) \\ G_P \sin(\Psi_p) \\ \frac{b_0}{P_0^2} \end{bmatrix} \cong T\hat{X}_{k|k}^M$$

This estimation should not be performed until the Kalman estimator has converged sufficiently. In order to be sure that it has, a length of time is allowed to elapse that is equal to several times the characteristic time constant $\tau_K$ of the estimator before estimating the transfer function. By taking a length of time that is equal to six times the characteristic time constant $\tau_K$, it is ensured that the estimation error has convergence of 0.25%.

In order to ensure that the bias of the mechanical system (e.g. associated with the presence of unbalance or of a return member in a movement transmission) does not disturb determination the transfer function, it should be observed that it is necessary to ensure that the amplitude of the sinusoidal signal is sufficient to be able to ignore the effects that are not generated by the sinusoidal signal.

Figure 5:
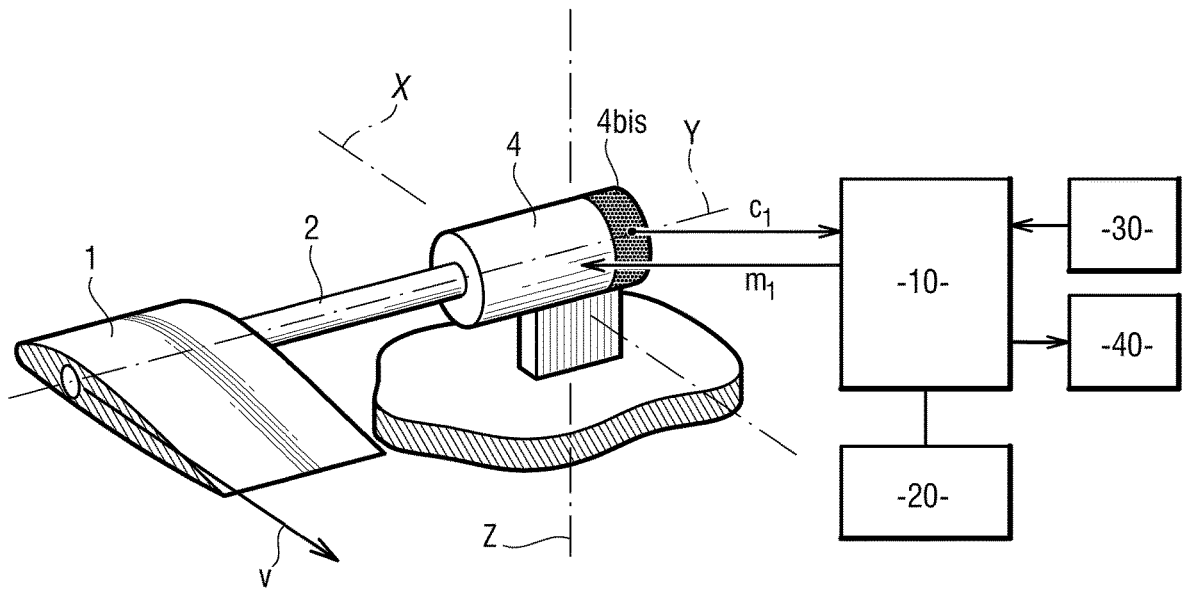
FIG. 5 is a diagrammatic perspective view of a device of the invention for actuating a flight control.

With reference to FIG. 5, for an airplane control surface device, the aiming line v is replaced by the plane of the aileron. The aileron 1 is connected to the assembly of the motor 3 and the coder 3 bis by a transmission shaft 2 pivotally connected to the remainder of the airplane.

Naturally, the invention is not limited to the implementation described, but covers any variant coming within the ambit of the invention as defined by the claims.

In particular, the invention is applicable to any type of electromechanical system that can be modelled by means of a linear transfer function, and it is therefore not limited to an application to an airplane control surface or to a device for aiming and stabilizing an optical sensor. In particular, the invention can be used with any device including an actuator controlled by servocontrol and measurements that are accessible to calculation means.

Other modelling parameters may be selected as a function of the intended application. The sampling frequency, the variances, the number of frequencies to be estimated, . . . .

The term "sinusoidal signal" is used to cover both a sine signal and a cosine signal.

The software module may receive as input the measurement of the output variable of the linear system and/or the difference between the measurement of the output variable of the linear system and the control setpoint.

Although in the embodiments described the rotation matrix is defined as a function of the components of the vector representative of the sinusoidal excitation signal, which is advantageous in terms of simplifying calculation, that is not essential.

Furthermore, it should be observed that in the embodiment described, account is taken of three measurements e1, e2, and e3:

- e2 and e3 for the "open loop" (K*H), i.e. one upstream from the summing circuit (e3) and one downstream from the summing circuit (e2); and
- e1 and e2 for the transfer function of the electromechanical system (H).

In contrast, if it is desired to measure simultaneously both inertial speeds, the positions of the two coders, and both motor currents, it is possible to use e4, e5, and e6 in addition to e1.

The matrix T may have various different forms:
to have $b_0$, use:

$$T = \frac{1}{P_0^2}\begin{bmatrix} (X_k^P)_1 & (X_k^P)_2 & 0 \\ -(X_k^P)_2 & (X_k^P)_1 & 0 \\ 0 & 0 & P_0^2 \end{bmatrix}$$

to have $b_0/P_0$, use:

$$T = \frac{1}{P_0^2}\begin{bmatrix} (X_k^P)_1 & (X_k^P)_2 & 0 \\ -(X_k^P)_2 & (X_k^P)_1 & 0 \\ 0 & 0 & P_0 \end{bmatrix}$$

to have $b_0/P_0^2$, use:

$$T = \frac{1}{P_0^2}\begin{bmatrix} (X_k^P)_1 & (X_k^P)_2 & 0 \\ -(X_k^P)_2 & (X_k^P)_1 & 0 \\ 0 & 0 & 1 \end{bmatrix}$$

it is possible not to calculate $b_0$:

$$T = \frac{1}{P_0^2}\begin{bmatrix} (X_k^P)_1 & (X_k^P)_2 & 0 \\ -(X_k^P)_2 & (X_k^P)_1 & 0 \\ 0 & 0 & 0 \end{bmatrix}$$

The invention claimed is:

1. A device comprising at least one electromechanical system having an input and at least one output, and an electronic control unit comprising both a servo control loop connecting together the input and the output of the electromechanical system, and also a digital corrector, the device being characterized in that it includes a software module having an input connected to the output of the electromechanical system and an output connected to an input of electromechanical system, and in that, for each frequency in a set of frequencies that are to be analyzed, the software module is programmed:

to generate at least one sinusoidal excitation signal (P);
to issue the sinusoidal excitation signal on its output and to recover a response signal on its input;
to model the response signal by means of a Fresnel representation and to filter it about the excitation frequency by means of at least one Kalman filter in order to obtain a state vector of the filtered response signal;
to multiply the state vector by a rotation matrix in order to obtain a real part and an imaginary part; and
to perform complex number division to obtain at least one transfer function for the system from the model, from the excitation signal, and from the input signal.

2. The device according to claim 1, wherein the signal generator is based on a representation of a Fresnel vector rotating in compliance with the following model:

initial condition:

$$X_0^P = \begin{bmatrix} P_0 \\ 0 \end{bmatrix}$$

the excitation signal having the dynamic range:

$$X_{k+1}^P = \Delta A_P X_k^P$$

the signal to be applied to the output of the corrector:

$$P_K = C_P \cdot X_k^P$$

with the following matrices for the state representation:

$$\begin{cases} \Delta A_P = \begin{bmatrix} \cos(2\pi f_p T_e) & -\sin(2\pi f_p T_e) \\ \sin(2\pi f_p T_e) & \cos(2\pi f_p T_e) \end{bmatrix} & B_P = \begin{bmatrix} 0 \\ 0 \end{bmatrix} \\ D_p = 0 \end{cases}$$

in which $C_p=[0\ 1]$ or $C_p=[1\ 0]$.

3. The device according to claim 2, wherein the covariance matrix of the measurement noise is selected to be equal to 1 and the covariance matrix W of the model noise is selected as follows:

$$W = \begin{pmatrix} \sigma_{line}^2 & 0 & 0 \\ 0 & \sigma_{line}^2 & 0 \\ 0 & 0 & \sigma_{bias}^2 \end{pmatrix}$$

where $\sigma_{bias}^2$ is the bias variance and $\sigma_{line}^2$ is the variance of the signal at the input to the software module.

4. The device according to claim 3, wherein the variance $\sigma_{bias}^2$ is set at $10^{-2}$ and the variance $\sigma_{line}^2$ is set at $10^{-4}$ for a sampling frequency equal to 3 kHz.

5. The device according to claim 2, wherein the rotation matrix is defined as a function of the components of the vector that is representative of the sinusoidal excitation signal.

6. The device according to claim 5, wherein the rotation matrix has the following form:

$$X^F = T_k \cdot X_k^M$$

$$T_k = \frac{1}{P_0^2}\begin{bmatrix} (X_k^P)_1 & (X_k^P)_2 \\ -(X_k^P)_2 & (X_k^P)_1 \end{bmatrix}$$

$$T_k = \frac{1}{P_0^2}\begin{bmatrix} (X_k^P)_1 & (X_k^P)_2 & 0 \\ -(X_k^P)_2 & (X_k^P)_1 & 0 \\ 0 & 0 & 1 \end{bmatrix}.$$

7. The device according to claim 1, wherein the dynamic range of the excitation signals and the dynamic range of the measurement signals are defined by the following equations:

$$\begin{cases} X_{k+1}^M = \Delta A_M X_k^M + B_M U_k + M w_k \\ Y_k^M = C_M X_k^M + D_M U_k + v_k \end{cases}$$

where:

$$X_K^M = \begin{bmatrix} M_p \cos(2\pi f_p k T_e + \Psi_p) \\ M_p \sin(2\pi f_p k T_e + \Psi_p) \\ b_0 \end{bmatrix}$$

$$Y_k^M = b_0 + M_p \sin(2\pi f_p k T_e + \Psi_p)$$

$$G_p = \frac{M_p}{P_0}$$

in which $X_K^M$ includes as components at least the cosine and sine of the state vector, $G_p$ is the gain, $f_p$ is the excitation frequency, $\Psi_p$ is the phase, dt is the sampling period, $w_k$ represents model noise and $v_k$ represents measurement noise, $b_0$ is continuous component of the system, $\Delta A_M$, $B_M$, $C_M$, $D_M$ are state matrices, and the matrix M is such that $$M = \begin{pmatrix} 1 & 0 & 0 \\ 0 & 1 & 0 \\ 0 & 0 & 1 \end{pmatrix}.$$

8. The device according to claim 7, wherein the matrices $\Delta A_M$, $B_M$, $C_M$, $D_M$ are determined as follows:

$$\Delta A_M = \begin{bmatrix} \cos(2\pi f_p T_e) & -\sin(2\pi f_p T_e) \\ \sin(2\pi f_p T_e) & \cos(2\pi f_p T_e) \end{bmatrix}$$

$$B_M = \begin{bmatrix} 0 \\ 0 \end{bmatrix}$$

$$C_M = [\,0 \;\; 1\,] \quad D_M = 0$$

where $T_e$ is the sampling period of the calculation means, and $f_p$ is the current frequency being scanned.

9. The device according to claim 7, wherein the matrices $4A_M$, $B_M$, $C_M$, $D_M$ are determined as follows:

$$\Delta A_M = \begin{bmatrix} \cos(2\pi f_p T_e) & -\sin(2\pi f_p T_e) \\ \sin(2\pi f_p T_e) & \cos(2\pi f_p T_e) \end{bmatrix}$$

$$B_M = \begin{bmatrix} 0 \\ 0 \end{bmatrix}$$

$$C_M = [\,1 \;\; 0\,] \quad D_M = 0$$

where $T_e$ is the sampling period of the calculation means, and $f_p$ is the current frequency being scanned.

10. The device according to claim 7, wherein the matrices $\Delta A_M$, $B_M$, $C_M$, $D_M$ are determined as follows:

$$\Delta A_M = \begin{bmatrix} \cos(2\pi f_p T_e) & -\sin(2\pi f_p T_e) & 0 \\ \sin(2\pi f_p T_e) & \cos(2\pi f_p T_e) & 0 \\ 0 & 0 & 1 \end{bmatrix}$$

$$B_M = \begin{bmatrix} 0 \\ 0 \\ 0 \end{bmatrix}$$

$$C_M = [\,0 \;\; 1 \;\; 1\,] \quad D_M = 0$$

where $T_e$ is the sampling period of the calculation means, and $f_p$ is the current frequency being scanned.

11. The device according to claim 7, wherein the matrices $4A_M$, $B_M$, $C_M$, $D_M$ are determined as follows:

$$\Delta A_M = \begin{bmatrix} \cos(2\pi f_p T_e) & -\sin(2\pi f_p T_e) & 0 \\ \sin(2\pi f_p T_e) & \cos(2\pi f_p T_e) & 0 \\ 0 & 0 & 1 \end{bmatrix}$$

$$B_M = \begin{bmatrix} 0 \\ 0 \\ 0 \end{bmatrix}$$

$$C_M = [\,1 \;\; 0 \;\; 1\,] \quad D_M = 0$$

where $T_e$ is the sampling period of the calculation means, and $f_p$ is the current frequency being scanned.

12. The device according to claim 7, wherein the Kalman filter is implemented in the following simplified form:

$$\begin{cases} X_{k+1}^M = \Delta A_M X_k^M + M w_k \\ Y_k^M = C_M X_k^M + v_k \end{cases}.$$

\* \* \* \* \*